Figure 1:
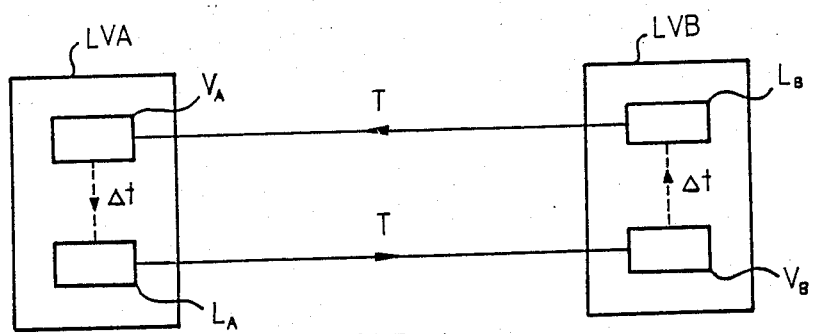

United States Patent [19]

Jukkala

[11] Patent Number: 4,894,810
[45] Date of Patent: Jan. 16, 1990

[54] METHOD AND A DEVICE FOR MEASURING A DISTANCE BY MEANS OF ULTRASONIC PULSES

[75] Inventor: Esko H. Jukkala, Turku, Finland
[73] Assignee: Mikrovalmiste U.J. Pulkkanen Oy, Turku, Finland
[21] Appl. No.: 99,920
[22] PCT Filed: Jan. 27, 1987
[86] PCT No.: PCT/FI87/00014
  § 371 Date: Sep. 4, 1987
  § 102(e) Date: Sep. 4, 1987
[87] PCT Pub. No.: WO87/04527
  PCT Pub. Date: Jul. 30, 1987
[30] Foreign Application Priority Data
  Jan. 28, 1986 [FI] Finland ................. 860394
[51] Int. Cl.⁴ ................................................ G01S 3/80
[52] U.S. Cl. ................................ 367/118; 367/127; 367/2
[58] Field of Search ............ 367/118, 127, 2, 6, 367/909; 342/29, 30

[56] References Cited

U.S. PATENT DOCUMENTS

| | | | |
|---|---|---|---|
| 3,159,832 | 12/1964 | Cox, Jr. | 342/29 |
| 3,895,382 | 7/1975 | Litchford | 342/32 |
| 4,026,654 | 5/1977 | Beaurain | 367/6 |
| 4,254,478 | 3/1981 | Dumas | 367/2 |
| 4,376,990 | 3/1983 | Metchev | 367/95 |

Primary Examiner—Thomas H. Tarcza
Assistant Examiner—Daniel T. Pihulic
Attorney, Agent, or Firm—Bell, Seltzer, Park & Gibson

[57] ABSTRACT

The invention relates to a method and a device for measuring a distance by means of an ultrasound. A drawback of this type of known methods for measuring a distance is that the transmitting and the receiving devices are separate, and they are designed to function according to whether they are positioned at a point of origin or at a target point of a measuring interval. For solving this problem, transmitter-receiver units (LVA, LVB) at the ends of a measuring interval are identical and interact continuously with each other so that the measuring result can be read in both devices.

4 Claims, 1 Drawing Sheet

METHOD AND A DEVICE FOR MEASURING A DISTANCE BY MEANS OF ULTRASONIC PULSES

The invention relates to a method and a device for measuring a distance between two points by means of ultrasonic pulses.

It is well-known that the distance between two points can be measured in various ways. It is known to send an electromagnetic, acoustic or optical signal from a point of origin so that it is reflected back from a target point to the point of origin. The distance between the points is determined on the basis of the to-and-fro transmission time. In this way of measuring, a passive echo from the target point is not usually sufficient, but the target has to be provided with a reflector in order that the magnitude of the echo to be received would be sufficient.

Further, U.S. Pat. No. 4,254,478 discloses a method for the determination of a distance by means of ultrasonic pulses, in which method the target point is provided with a transmitter which sends the pulse back to its point of origin after a determined delay. The function of the delay is to eliminate possible disturbing echos from the surroundings.

A drawback of this known method for the determination of a distance by means of ultrasonic pulses is that the transmitting and the receiving means are separate, and they are designed to function according to whether they are positioned at the point of origin or at the target point of the measuring interval. Furthermore, the measuring result can be read only at one end of the measuring interval. On account of the rigid nature of the measuring methods, it is not easy to observe a varying distance between measuring points.

However, it would often be desirable that observers at different points would be able to easily follow the movements of each other and to control continuously the distance between the locations. This is necessary for, for example, policemen, divers, and in the field of land surveying and building.

The object of the invention is to eliminate the above drawbacks and to provide a method for the measurement of distances, which method enables a more flexible operation than known methods. This is achieved by means of the method disclosed in the prior art portion of claim 1 by means of the operational steps described in the characterizing portion of the claim.

Thus, the basic idea of the invention is to provide a method for measuring a distance in such a manner that devices positioned at different points interact with each other continuously and that the measuring result is visible in both devices.

On the other hand, the object of the invention is to provide a measuring device which is suitable for the measuring method and which ensures the simplest possible use. This is achieved in accordance with the characterizing portion of claim 4.

Since the devices positioned at the different points are identical, even a layman unfamiliar with the measuring techniques finds it easy to use them, and he does not need to know whether he should have with him a device intended for the point of origin or a device intended for the target point. The identical structure of the devices also makes them easier to realize and produce industrially.

Figure 2:
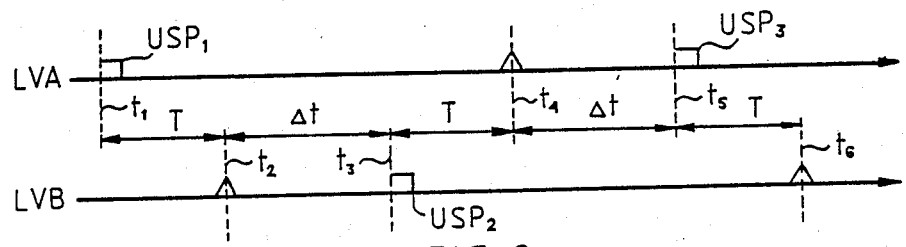
Figure 3:
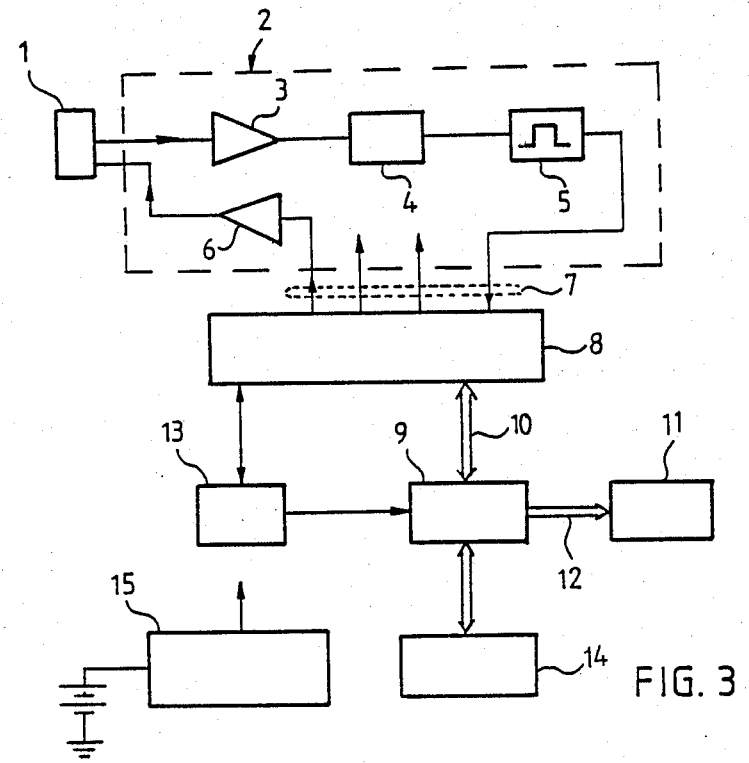

In the following the invention will be described in more detail with reference to the attached drawing, wherein FIG. 1 is a simplified view of transceiver units used in the method according to the invention and the interaction therebetween, FIG. 2 illustrates on a time axis the significant events of the measuring procedure according to FIG. 1, FIG. 3 is a block diagram of the structure of the transceiver unit used in the method according to the invention.

In FIG. 1, the transceiver (transmitter-receiver) units LVA and LVB are positioned at a determined distance from each other. The transceiver unit LVA comprises a transmitter $L_A$ and a receiver $V_A$, and the transceiver unit LVB correspondingly a transmitter $L_B$ and a receiver $V_B$. The measuring can be started at either end of the measuring interval. In the following example, the measuring is started by means of the device LVA by sending with the transmitter $L_A$ an ultrasonic pulse to the device LVB, the counter of the device LVA being started simultaneously (the counter is not shown in FIG. 1 for the sake of clarity). In FIG. 2, the upper time axis, indicated LVA, illustrates the significant events of the device LVA, and the lower time axis, indicated LVB, illustrates the significant events of the device LVB. The moment when the device LVA sends an ultrasonic pulse $USP_1$ as indicated by $t_1$ on the time axis. The pulse is received by the receiver $V_B$ at a moment $t_2$, the delay means of the device LVB being started simultaneously (said means is not shown in FIG. 1). The transmission time from the device LVA to the device LVB is indicated by T in FIGS. 1 and 2. The delay is intended to delay the transmission until any possible disturbing reflections are fatigued. After the delay time at $\Delta t$ of the device LVB is pased, the transmitter $L_B$ sends an ultrasonic pulse $USP_2$ at a moment $t_3$, the counter of the device LVB being started simultaneously (the counter is not shown in FIG. 1). The pulse sent is received after the transmission time T at a moment $t_4$ in the device LVA, the delay means of the device LVA being started simultaneously (the means is not shown), and the counter which was started earlier at the moment $t_1$ is stopped, whereafter the measuring result calculated on the basis of the time interval measured by the counter can be read in the device LVA. After the delay time $\Delta t$ of the device LVA, preferably equal to that of the device LVB, the transmitter LA sends an ultrasonic pulse $USP_3$ at a moment $t_5$, which pulse is received by the receiver $V_B$ of the device LVB after the transmission time T at a moment $t_6$, as a result of which the delay means of the device LVB is started, and the counter which was started earlier at the moment $t_3$ is stopped, whereafter the measuring result is visible in the device LVB, too. After the delay time $\Delta t$ of the device LVB, the device again sends an ultrasonic pulse and the measuring procedure continues as described above, the devices interacting continuously with each other. For the sake of clarity, the synchronizing of the devices at the beginning of the measuring procedure has not been described, because it does not belong to the basic idea of the invention.

The length of the delay time $\Delta t$ of the devices has to be selected so that it is sufficiently long in view of the largest operating range between the devices and the speed of travel of the pulse in the medium. When the delay $\Delta t$ and the speed of travel of the pulse in the medium are known, the distance between the devices can, of course, be calculated from the measured time interval.

FIG. 3 illustrates more closely the structure of the transceiver unit LVA or LV$_B$ according to the invention. As mentioned above, the devices are identical in structure. A transceiver sensor 1 operating at equal transmission and reception frequencies is connected to a transceiver component 2 the reception side of which comprises a reception amplifier 3 connected after the sensor 1, and a detector circuit 4 and a pulse shaping circuit 5 connected after the reception amplifier. On the transmission side, a pulse is applied to the sensor 1 through a transmission amplifier 6. The transceiver component 2 is connected through a bus 7 to a counter and control gate component 8 which communicates through a two-way bus 10 with a processor component 9 controlling the operations of the apparatus. The processor component 9 controls a display unit 11 through a bus 12. A calibration component 13 is connected both the the counter and control gate component 8 and to the processor component 9. The programmability of the device is represented by a program component 14 attached to the processor component 9. FIG. 3 also shows a current source component 15 supplying current to the device.

Since the speed of travel of the ultrasonic pulse varies, depending on the medium and its temperature, for example, it is necessary to calibrate the device for the operating conditions in each particular case. This measuring of the speed of travel by means of the calibration component 13 can be carried out in many ways, e.g. manually over a known distance, or automatically, whereby the processor component 9 corrects the measuring result. Being known for one skilled in the art, the calibration, however, is not within the scope of the inventive idea, so it is not more closely discussed here.

The delays $\Delta t$, essential to the devices, can be effected by the processor 9, which controls the operations of the device, on account of which no separate delay means are shown in FIG. 3. The processor 9 is informed of a received pulse through the control gates and the channel 10, and it gives a transmission signal to the transceiver component after the delay time. The compensation of the delay for obtaining a correct measuring result can also be carried out by the processor 9 so that the delay is taken into account with the processor calculates the measuring result. Alternatively, the compensation can be carried out in the counter and control gate component 8 so that the counter does not start the effective counting until the delay time has passed after the reception of the starting pulse by the counter.

Desired measuring results can be stored in the memory of the processor component 9; further, it is possible to display on the display 11 not only the measured distance but also the change of a distance, for instance. Naturally, it is also possible to carry out other calculating operations by the processor 9 and display them on the display unit 11.

Even though the invention has been described above with reference to the example of the attached drawing, it is self-evident that the invention is not restricted thereto, but it can be modified in various ways. For example, if no response is obtained to a sent ultrasonic pulse in a determined period of time, the sending of the pulse can be continued until a response pulse is obtained from the other device. Correspondingly, the structural details of the transceiver unit can be varied considerably within the inventive idea set forth in the following claims. It is also possible to use more than two devices simultaneously by synchronizing the devices with each other, i.e. by alternately measuring the distance between any two of the devices.

What is claimed is:

1. A method for measuring a distance between two points by means of ultrasonic pulses, comprising the steps of:
    (a) sending an ultrasonic pulse (USP$_1$) by means of a transceiver (LVA) positioned at a point of origin to a target point, whereby a counter (8) in the transceiver (LVA) is started;
    (b) receiving said ultrasonic pulse (USP$_1$) by a transceiver (LVB) positioned at the target point, whereby a first predetermined delay time of the transceiver (LVB) is started;
    (c) sending an ultrasonic pulse (USP$_2$) by the transceiver (LVB) to the point of origin after said first determined delay time is finished, whereby a counter (8) in the transceiver (LVB) is started;
    (d) receiving said ultrasonic pulse (USP$_2$) by means of the transceiver (LVA) at the point of origin, whereby a second predetermined delay time of the transceiver (LVA) is started simultaneously, the counter (8) thereof is stopped, and the measuring result is displayed in the transceiver (LVA);
    (e) sensing an ultrasonic pulse (USP$_3$) by the transceiver (LVA) to the target point after said second predetermined delay time of the transceiver (LVA) is finished whereby the counter (8) thereof is started;
    (f) receiving the ultrasonic pulse (USP$_3$) by means of the transceiver (LVB) at the target point, whereby said first predetermined delay time of the transceiver (LVB) is started simultaneously, and the counter (8) thereof is stopped,
    characterized in that
    said first predetermined delay time is equal to said second predetermined delay time, and equal frequencies are used in the transceivers (LV$_A$, LVB), whereby
    (g) in step (f) the measuring result is displayed also in the transceiver (LVB) positioned at the target point; and
    (h) the measuring is continued from step (c) until it is interrupted.

2. A method according to claim 1, characterized in that different measuring results are stored in a memory for processing.

3. A method according to claim 2, characterized in that a distance change is optionally displayed in addition to a distance measured between said two points.

4. A device for measuring a distance between two points by means of ultrasonic pulses, comprising transceivers (LVA,LVB) positioned at a point of origin and a target point, each transceiver comprising as a combination:
    a transmitter (L$_A$, L$_B$) and a receiver (V$_A$, V$_B$) for sending and receiving ultrasonic pulses;
    a counter component (8) for obtaining a count proportional to the time between sending an ultrasonic pulse and receiving an ultrasonic pulse;
    delay means (8, 9) for determining a predetermined delay time ($\Delta t$) between the receiving moment of the ultrasonic pulse and a subsequent sending moment,
    characterized in that
    the transceivers (LVA, LVB) are identical, with all of said transmitters (L$_A$, L$_B$) and receivers (V$_A$, V$_B$) operating at a predetermined frequency, and said predetermined delay time at each transceiver being equal.

* * * * *

UNITED STATES PATENT AND TRADEMARK OFFICE
CERTIFICATE OF CORRECTION

PATENT NO. : 4,894,810

DATED : January 16, 1990

INVENTOR(S) : Esko H. Jukkala

It is certified that error appears in the above-identified patent and that said Letters Patent is hereby corrected as shown below:

Column 3, line 2, delete "$LV_B$" and insert -- LVB --.

Column 4, line 38, delete "$LV_A$" and insert -- LVA --.

Column 4, line 51, insert a space after -- (LVA, --.

Signed and Sealed this

Twenty-second Day of January, 1991

Attest:

HARRY F. MANBECK, JR.

*Attesting Officer*      *Commissioner of Patents and Trademarks*